United States Patent [19]
Sheldon

[11] Patent Number: 5,836,082
[45] Date of Patent: Nov. 17, 1998

[54] THREE-AXIS PROBE

[75] Inventor: Paul C. Sheldon, Mequon, Wis.

[73] Assignee: Sheldon/Van Someren Inc., Wauwatosa, Wis.

[21] Appl. No.: 722,364

[22] Filed: Sep. 27, 1996

[51] Int. Cl.[6] ............................ G01B 5/008; G01B 5/016
[52] U.S. Cl. ............................................ 33/556; 33/558.2
[58] Field of Search ........................................ 33/556–561

[56] References Cited

U.S. PATENT DOCUMENTS

| | | | |
|---|---|---|---|
| 3,869,799 | 3/1975 | Neuer et al. | 33/561 |
| 4,041,652 | 8/1977 | Graven et al. | 33/23.02 X |
| 4,078,314 | 3/1978 | McMurtry | 33/557 |
| 4,170,824 | 10/1979 | Mikulin | 33/30.02 |
| 4,503,616 | 3/1985 | Pullen | 33/558 |
| 4,554,740 | 11/1985 | Gill | 33/25.1 |
| 4,716,656 | 1/1988 | Maddock et al. | 33/559 |
| 4,825,557 | 5/1989 | Nettleton et al. | 33/558 X |
| 4,879,916 | 11/1989 | Juillerat | 73/863.8 |
| 5,390,424 | 2/1995 | Butter et. al. | 33/561 |
| 5,505,005 | 4/1996 | McMurtry et. al. | 33/561 |
| 5,669,150 | 9/1997 | Guertin et al. | 33/556 X |
| 5,743,020 | 4/1998 | Sheldon | 33/559 |

OTHER PUBLICATIONS

Jean–Pierre Merlet, published on the Internet at http://www.inria.fr/prisme/personnel/merlet/merleteng. html, § Parallel manipulators, drawings and references for *Manipulateurs a 3 degres de liberte.* pp. 1–12+pp. 1–5 of bibliogrophy dated Nov. 5, 1926.

*Primary Examiner*—Thomas P. Noland
*Attorney, Agent, or Firm*—Robert A. Van Someren

[57] ABSTRACT

A three-axis sensor device, such as a probe, includes a base structure and a stylus supporting member. The base structure and stylus supporting member are connected by three linkages that limit movement of the stylus supporting member relative to the base structure to movement along the three linear axes. Each linkage includes parallel articulated legs that limit rotational motion of the stylus supporting member. Three sensors also are disposed between the base structure and the stylus supporting member to sense movement of one with respect to the other.

19 Claims, 4 Drawing Sheets

THREE-AXIS PROBE

FIELD OF THE INVENTION

The present invention relates generally to a three-axis sensing device, such as a sensing probe of the type used on a coordinate positioning machine, and particularly to a device able to sense relative movement of two structures along three linear axes.

BACKGROUND OF THE INVENTION

A variety of touch probes are used with coordinate positioning machines, such as coordinate measuring machines or machine tools, to measure a position on or along a surface, e.g., a workpiece surface. There are many coordinate positioning machine designs, but such machines typically include a moveable arm to which the probe is attached. The arm is supported for movement relative to a datum, such as a platform or table on which a workpiece is supported. This allows an operator to use the coordinate positioning machine in combination with the probe to determine whether certain positions on the workpiece are at their proper location relative to the datum.

Some probes, such as touch probes, are designed to produce a signal when the stylus carried by the probe contacts a surface. This type of probe includes a fixed structure that is mounted to the moveable arm of the coordinate positioning machine. A stylus structure is supported on the fixed structure at several locations. For example, the stylus structure may include three balls biased against a contact surface of the fixed structure. In some designs, the balls and contact surfaces are part of a circuit which is broken when the stylus contacts an object and one of the balls is forced away from the contact surface. When the circuit is broken, a signal is provided to indicate the contact between the stylus and the object. In other probes, the stylus support structure is connected to a strain sensor that provides a signal when strain is induced via contact of the stylus with an object.

With these types of probes, it is critical that the stylus be moved back to a precise and repeatable rest position after contact with an object. Sometimes grooves are formed in the contact surface to assist in precisely reseating the balls after deflection of the stylus. Without this precise reseating of the stylus support structure, the position of the stylus would be different for each subsequent measurement of position, and errors would be introduced into the measurement. It often is difficult maintain a mechanically repeatable rest position, because wear can result due to the repeated contact between the balls and the contact surface and due to the electrical current that can degrade electrical contacts.

Attempts have been made to design probes able to measure movement of the stylus after contact with an object. If this movement can be measured, then it is a straightforward mathematical calculation to determine the location of the stylus prior to movement and thus the precise point of contact with the object being measured, obviating the need for a precise mechanically repeatable rest position. In any linear three-axis probe, movement of the stylus supporting member must be accurately constrained to movement along the three linear axes, otherwise errors are introduced that prohibit the probe from accurate sensing of positions. However, a stylus, like any object, potentially can be moved with six degrees of freedom. Without restraint, the stylus can be moved along the linear axes x, y and z, but it can also be moved along the rotational axes, commonly known as the a-axis, b-axis, and c-axis. The a, b and c axes represent rotational movement of an object about the x, y and z axes respectively. Although movement could be sensed along all six axes, it is often necessary or desirable to measure movement along only the three linear axes. Existing three-axis probes use a complex arrangement of slides and plane surfaces to permit movement of the stylus solely along the three linear axes.

It would be advantageous to provide a three-axis sensor device having a rigid, reliable and relatively simple construction to indicate position and track movement of a stylus along the three linear axes. It would also be advantageous to have a sensor device that could continually sense the relative motion between two objects.

SUMMARY OF THE INVENTION

The preferred embodiment of the present invention features a three-axis probe structure for use with a coordinate positioning machine having a moveable arm. The probe includes a base structure configured to permit mounting of the probe to the moveable arm. A stylus supporting member is connected to the base structure by a linkage assembly. The linkage assembly comprises a plurality of linkages, with each linkage having a pair of parallel articulated legs connected between the base structure and the stylus supporting member. The pairs of articulated legs are arranged to permit movement of the stylus supporting member relative to the base structure only along the three linear axes. The parallel articulated legs prevent undesired rotational movement of the stylus supporting member relative to the base structure.

According to a further aspect of the invention, a sensor device is provided for use in measuring relative movement between two objects. The sensor device includes a base structure and a supporting member connected to a second structure that moves relative to the base structure. A plurality of articulated legs connect the base structure to the supporting member. The legs are divided into parallel pairs arranged to restrict rotary movement of the supporting member relative to the base structure along the three rotary axes. A sensor system is connected between the base structure and the supporting member to sense their relative movement and ultimately the relative movement between the second structure and the base structure.

According to another aspect of the invention, a method is provided for preparing a probe structure that is used in a coordinate positioning machine having a moveable arm. The method comprises the steps of preparing a base structure that may be mounted to the moveable arm and preparing a stylus supporting member to which the stylus may be attached. The method further includes connecting the stylus supporting member to the base structure by a plurality of linkages, where each linkage has a pair of hinged legs that are parallel to one another. According to a more detailed aspect of the invention, the method further includes the steps of constraining one end of each hinged leg to a single degree of rotational freedom and providing the opposite end of each hinged leg with at least two rotational degrees of freedom.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
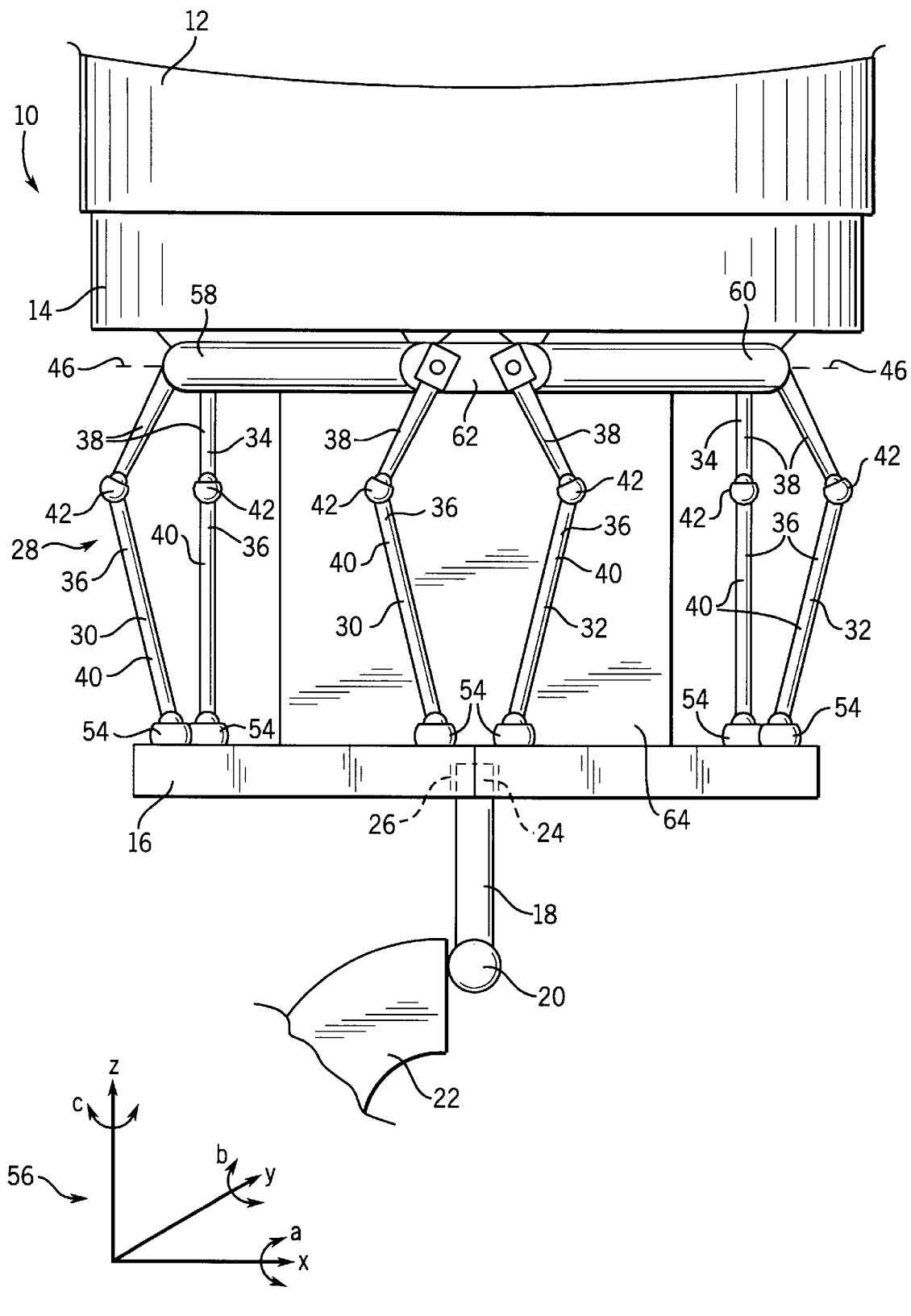
FIG. 1 is a front view of a three-axis probe according to a preferred embodiment of the present invention.
Figure 2:
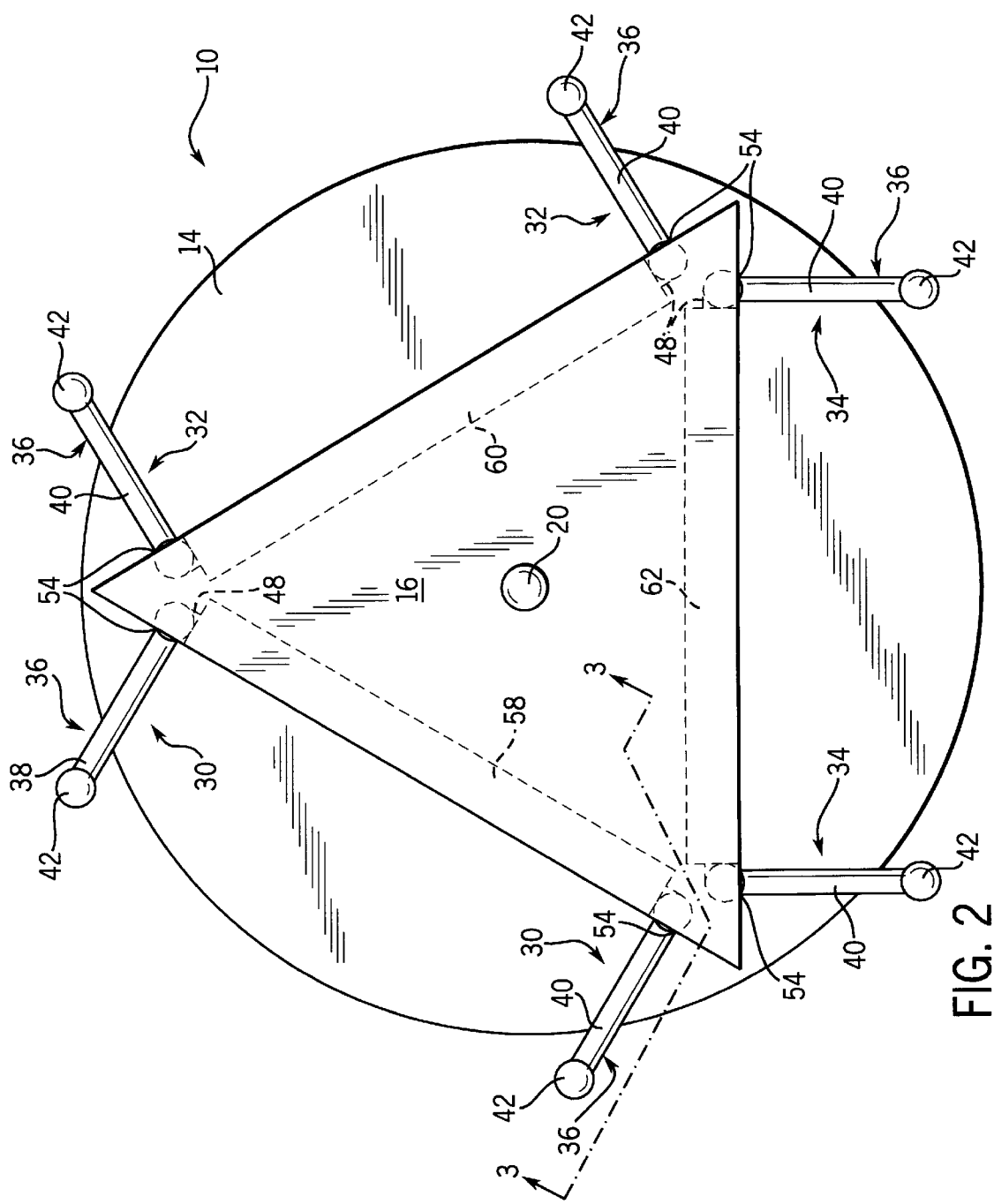
FIG. 2 is a bottom view of the probe illustrated in FIG. 1.

Referring generally to FIGS. 1 and 2, a three-axis sensor device, such as a probe 10, is illustrated. Probe 10 can be used with a variety of coordinate positioning machines, such as coordinate measurement machines or machine tools. Typically, such machines include a moveable arm 12 to which probe 10 may be attached in a conventional manner.

Probe 10 includes a base structure 14 that may be mounted to moveable arm 12. Preferably, base structure 14 is configured for removeable mounting to arm 12 by, for instance, any of a variety of ways known to those or ordinary skill in the art. Probe 10 also includes a stylus supporting member 16 designed to securely hold a stylus 18. Stylus 18 includes a sensing tip 20 that can be moved into contact with a workpiece 22. Preferably, stylus 18 is replaceable and removeably attached to stylus supporting member 16 by, for example, a threaded portion 24 received in a threaded bore 26 of stylus supporting member 16.

Stylus supporting member 16 is connected to base structure 14 by a linkage assembly 28. Linkage assembly 28 comprises a plurality of linkages and typically three linkages 30, 32 and 34. Each linkage 30, 32, and 34 has a pair of articulated legs 36 that preferably are parallel to one another. In other words, in each linkage, the pairs of articulated legs have corresponding components that remain parallel to one another during movement of the stylus supporting member 16 with respect to the base structure 14. Specifically, each articulated leg 36 includes a first member 38 connected to a second elongated member 40 by a pivot joint 42. The linkages 30, 32 and 34 preferably are designed so that in each linkage the pair of first members 38 are of equal length and remain parallel at all times during movement of stylus supporting member 16 relative to base structure 14. Similarly, in each linkage the pair of second elongate members 40 preferably are of equal length and remain parallel to one another during movement of stylus supporting member 16 relative to base structure 14.

Figure 3:
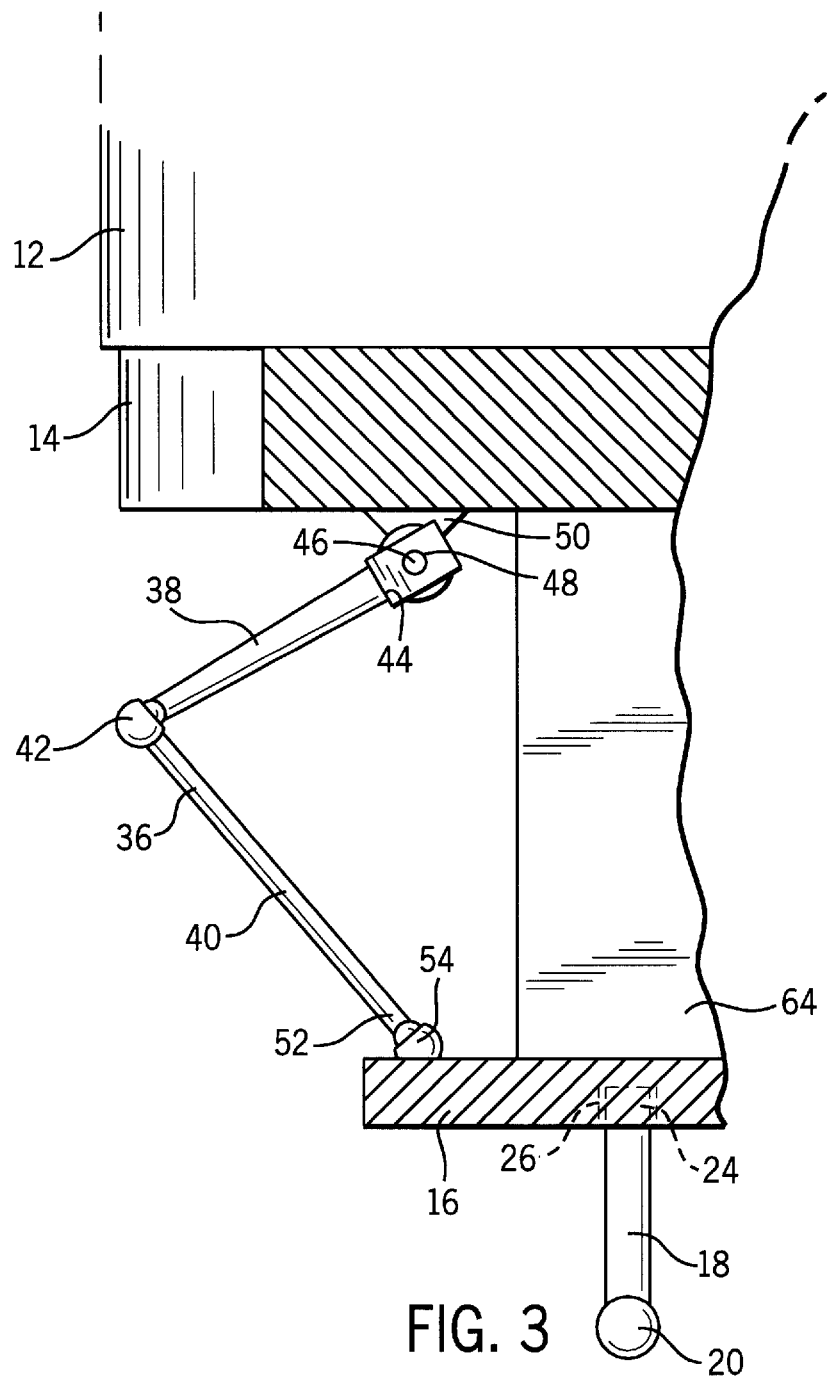
FIG. 3 is a partial cross-sectional view taken generally along line 3—3 of FIG. 2.

With reference to FIG. 3, each articulated leg 36 includes a first end 44 pivotably mounted to base structure 14 for pivotable motion with one degree of freedom about an axis 46. This may be accomplished by rigidly connecting the first elongate members 38 on each linkage to a shaft 48 rotatably mounted to a bearing support 50 of base structure 14. Each pair of first members 38 is oriented on their corresponding shaft 48 in a generally parallel orientation, as described above.

Each articulated leg 36 also includes a second end 52 that is pivotably mounted to stylus supporting member 16 by a pivot joint 54. Pivot joint 54 should permit second elongate member 40 to move with at least two degrees of freedom with respect to stylus supporting member 16. For example, the illustrated ball and socket type joint could be used. Similarly, each pivot joint 42 should be provided with at least two degrees of freedom. In other words, second elongate member 40 should be able to move relative to first member 38 with at least two degrees of freedom. As with pivot joint 54, the illustrated ball and socket joint could be used.

With each articulated leg 36 so constrained, each pair of first members 38 will remain parallel to one another during movement of stylus supporting member 16 relative to base structure 14. Thus, the first members 38 of each pair could be reinforced with cross-struts, or they could even be formed integrally with a solid plate or some other reinforcement structure mounted for rotational movement about axis 46. The second elongate members 40 of each linkage also remain parallel to each other during movement of stylus supporting member 16 relative to base structure 14.

By arranging these pairs of parallel articulated legs 36 on three different sides of stylus supporting member 16 and base structure 14, as best illustrated in FIG. 2, stylus supporting member 16 is prevented from undesired rotational movement with respect to base structure 14, i.e., undesired movement along any of the rotational axes a, b and c as shown by diagram 56 of FIG. 1. Because of this arrangement of legs 36, when stylus 18 is brought into contact with or dragged along the surface of workpiece 24, any twisting forces exerted on stylus supporting member 16 are absorbed in either tension or compression by first members 38 and second elongate members 40. Therefore, stylus 18 only can be moved through space with three degrees of freedom defined by linear axes x, y and z. Any twisting, i.e., rotational, movement of stylus 18 along rotational axes a, b or c is rigidly restricted by the linkages.

A sensor system cooperates with stylus supporting member 16 and base structure 14 to sense the position and movement of sensing tip 20. In the illustrated embodiment, a plurality of sensors 58, 60 and 62 are connected to articulated legs 36 to ultimately sense this movement. In the exemplary illustrated embodiment, sensors 58, 60 and 62 include angular measurement devices, such as encoders, connected to bearing supports 50 to sense movement of the corresponding shafts 48. Individual sensors 58, 60 and 62 cooperate with linkages 30, 32 and 34, respectively, to produce signals indicative of the position and movement of those linkages. From the angular positions of the pairs of first elongate members 38, the exact position and movement of sensing tip 20 can mathematically be calculated by, for instance, a computer. Alternatively, sensors could be arranged in various combinations on pivot joints 42 or pivot joints 54 to determine position. Linear sensors, such as LVDTs, also could be connected between the first member 38 and second elongate member 40 on a leg 36 of each linkage or directly between stylus supporting member 16 and base structure 14. In the latter arrangement, there preferably would be three, non-parallel, linear sensors, each pivotably connected at one end to stylus supporting member 16 and at the other end to base structure 14. Also, the orientation of the articulated legs 36 could be reversed so that first ends 44 are attached to stylus supporting member 16 while second ends 52 are attached to base structure 14.

Probe 10 preferably includes a resilient member 64 disposed to bias stylus supporting member 16 to a position away from base structure 14 as illustrated in FIG. 1. In the illustrated embodiment, resilient member 64 is placed in contact with and between base structure 14 and stylus supporting member 16. Resilient member 64 can be a block of foam rubber, a coil spring or any of a variety of other resilient members able to exert a biasing force that acts to move stylus supporting member 16 away from base structure 14.

Figure 4:
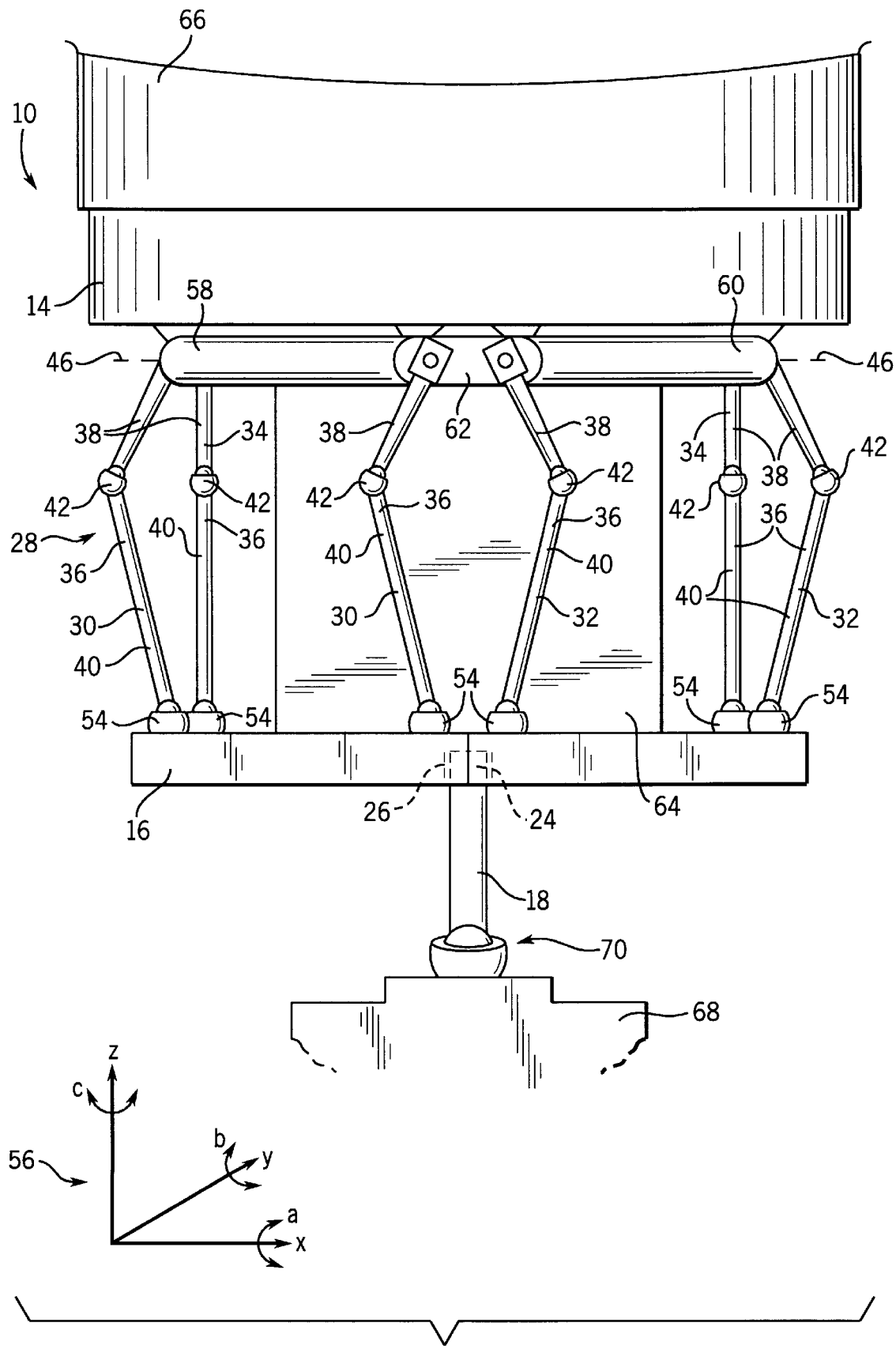
FIG. 4 is an alternate embodiment of the invention showing a three-axis sensor device connected between two structures.

Alternatively, as illustrated in FIG. 4, base structure 14 can be connected to or integrally formed with a reference structure 66. In this embodiment, supporting member 16 is connected to or formed as part of a second structure 68 to permit the tracking of movement of second structure 68 relative to reference structure 66. As illustrated, supporting member 16 could be connected to second structure 68 by stylus 18 or some other connecting member. Typically, the connector, e.g. stylus 18, would be pivotably mounted to second structure 68 by, for instance, a ball joint 70. The sensor system, e.g. sensors 58, 60 and 62, can be used to sense continuously the movement of supporting member 16 relative to reference structure 66 and ultimately to track the movement of second structure 68 (at least at the point of connection which is at a fixed position with respect to supporting member 16) relative to reference structure 66.

It will be understood that the foregoing description is of a preferred exemplary embodiment of this invention and that the invention is not limited to the specific form shown. For example, a variety of sensor systems can be used to sense the position and movement of the sensing tip along three axes. Additionally, numerous types of permanent or replaceable styli can be used in different orientations with respect to the stylus supporting member. Further, the resilient member may be a plurality of members disposed inside the legs, on the legs or external to the legs. These and other modifications may be made in the design and arrangement of the elements without departing from the scope of the invention as expressed in the appended claims.

What is claimed is:

1. A probe structure for use on a coordinate positioning machine having a moveable arm, the probe structure being designed to restrict unwanted rotational motion of a stylus, comprising:

a base structure configured to permit mounting of the probe to the moveable arm;

a stylus supporting member; and a linkage assembly comprising a plurality of linkages, each linkage having a pair of parallel, articulated legs connected between the base structure and the stylus supporting member, wherein each articulated leg includes a first end adapted to permit pivotable motion with a single degree of freedom and a second end adapted to permit pivotable motion with at least two degrees of freedom.

2. The probe structure as recited in claim 1, further comprising a plurality of sensors that sense movement of the stylus supporting member relative to the base structure.

3. The probe structure as recited in claim 2, wherein the plurality of sensors includes at least three angular measurement devices.

4. The probe structure as recited in claim 1, wherein the linkage assembly includes three linkages.

5. The probe structure as recited in claim 1, wherein the first end is connected to the base structure and the second end is connected to the stylus supporting member.

6. The probe structure as recited in claim 1, wherein the first end is connected to the stylus supporting member and the second end is connected to the base structure.

7. The probe structure as recited in claim 1, wherein each articulated leg includes a first member connected to a second member at a hinge joint that permits movement of the first member relative to the second member with at least two degrees of freedom.

8. The probe structure as recited in claim 7, wherein the first members of each pair of articulated legs remain parallel as the stylus supporting member moves relative to the base structure.

9. The probe structure as recited in claim 8, wherein the second members of each pair of articulated legs remain parallel as the stylus supporting member moves relative to the base structure.

10. The probe structure as recited in claim 9, wherein each of the first members of each pair of articulated legs include the first end constrained to the single degree of freedom.

11. The probe structure as recited in claim 1, further comprising a resilient member to bias the stylus supporting member to a position away from the base structure.

12. A method for preparing a probe structure for use on a coordinate positioning machine having a moveable arm, comprising the steps of:

preparing a base structure that may be mounted to the moveable arm;

preparing a stylus supporting member;

connecting the stylus supporting member to the base structure by a plurality of linkages, each linkage having a pair of hinged legs that are parallel to each other;

constraining one end of each hinged leg to a single degree of rotational freedom; and providing the opposite end of each hinged leg with at least two rotational degrees of freedom.

13. The method as recited in claim 12, further comprising the step of attaching a plurality of sensors between the stylus supporting member and the base structure to sense the relative movement.

14. The method as recited in claim 12, further comprising the step of providing each hinged leg with a hinge joint that permits two degrees of freedom of movement.

15. A structure for use on a coordinate positioning machine having a moveable arm, the structure being designed to restrict unwanted rotational motion of a stylus, comprising:

a base structure configured to permit mounting of the probe to the moveable arm;

a stylus supporting member; and a linkage assembly comprising a plurality of linkages connected between the base structure and the stylus supporting member, each linkage having a first section connected to one of the base structure or the stylus supporting member and constrained to one degree of freedom of motion and a second section connected between the first section and the other of the base structure or the stylus supporting member, the second section having a pair of parallel leg members that may pivot with at least two degrees of freedom with respect to the first section and to the other of the base structure or the stylus supporting member.

16. The structure as recited in claim 15, wherein the first section is connected to the base structure and the second section is connected to the stylus supporting member.

17. The structure as recited in claim 15, wherein the first section is connected to the stylus supporting member and the second section is connected to the base structure.

18. The structure as recited in claim 15, wherein the parallel leg members of the second section remain parallel as the stylus supporting member moves relative to the base structure.

19. The structure as recited in claim 15, further comprising a resilient member to bias the stylus supporting member to a position away from the base structure.

* * * * *